United States Patent

[11] 3,596,934

| [72] | Inventor | Herbert A. De Cenzo<br>17901 Yorba Linda Blvd., Apt. 20, Yorba Linda, Calif. 92686 |
|---|---|---|
| [21] | Appl. No. | 822,240 |
| [22] | Filed | May 6, 1969 |
| [45] | Patented | Aug. 3, 1971 |

[54] FLEXIBLE FLUIDTIGHT COUPLING FOR TUBES
18 Claims, 14 Drawing Figs.

[52] U.S. Cl. ..................................... 285/165,
285/233, 285/261, 285/347
[51] Int. Cl. ..................................... F16l 27/12
[50] Field of Search ........................... 285/164,
165, 166, 167, 233, 234, 261, 347, 424, 302

[56] References Cited
UNITED STATES PATENTS

| 1,533,886 | 4/1925 | Mueller et al. | 285/347 X |
| 2,305,296 | 12/1942 | Lanninger | 285/347 X |
| 2,477,533 | 7/1949 | Whiting | 285/347 X |
| 2,497,441 | 2/1950 | Detweiler | 285/233 |
| 2,918,313 | 12/1959 | Lazar et al. | 285/261 X |
| 3,186,739 | 6/1965 | Mahoff et al. | 285/347 X |
| 3,198,559 | 8/1965 | Snyder | 285/347 X |
| 3,223,438 | 12/1969 | De Cenzo | 285/233 |
| 3,438,657 | 4/1969 | Torres | 285/233 |

FOREIGN PATENTS

| 638,283 | 6/1950 | Great Britain | 285/261 |

*Primary Examiner*—Dave W. Arola
*Attorney*—William H. Maxwell

ABSTRACT: A coupling for tubular members in mechanically flexible fluidtight relation, and providing cooperative means permitting limited axial, angular, and longitudinal misalignments; while maintaining positive mechanical interengagement of at least one tubular member with a cooperating coupling member and with the assurance of fluidtight conduction therebetween. It is lightweight, thin-walled, metallic piping of the aircraft type with which the present invention is particularly concerned, and with the unique adaption thereto of elastomeric O-ring seals operable within uninterrupted cylindrical walls, as well as the adaptation thereto of sealing glands of varied materials and having varied sealing configurations.

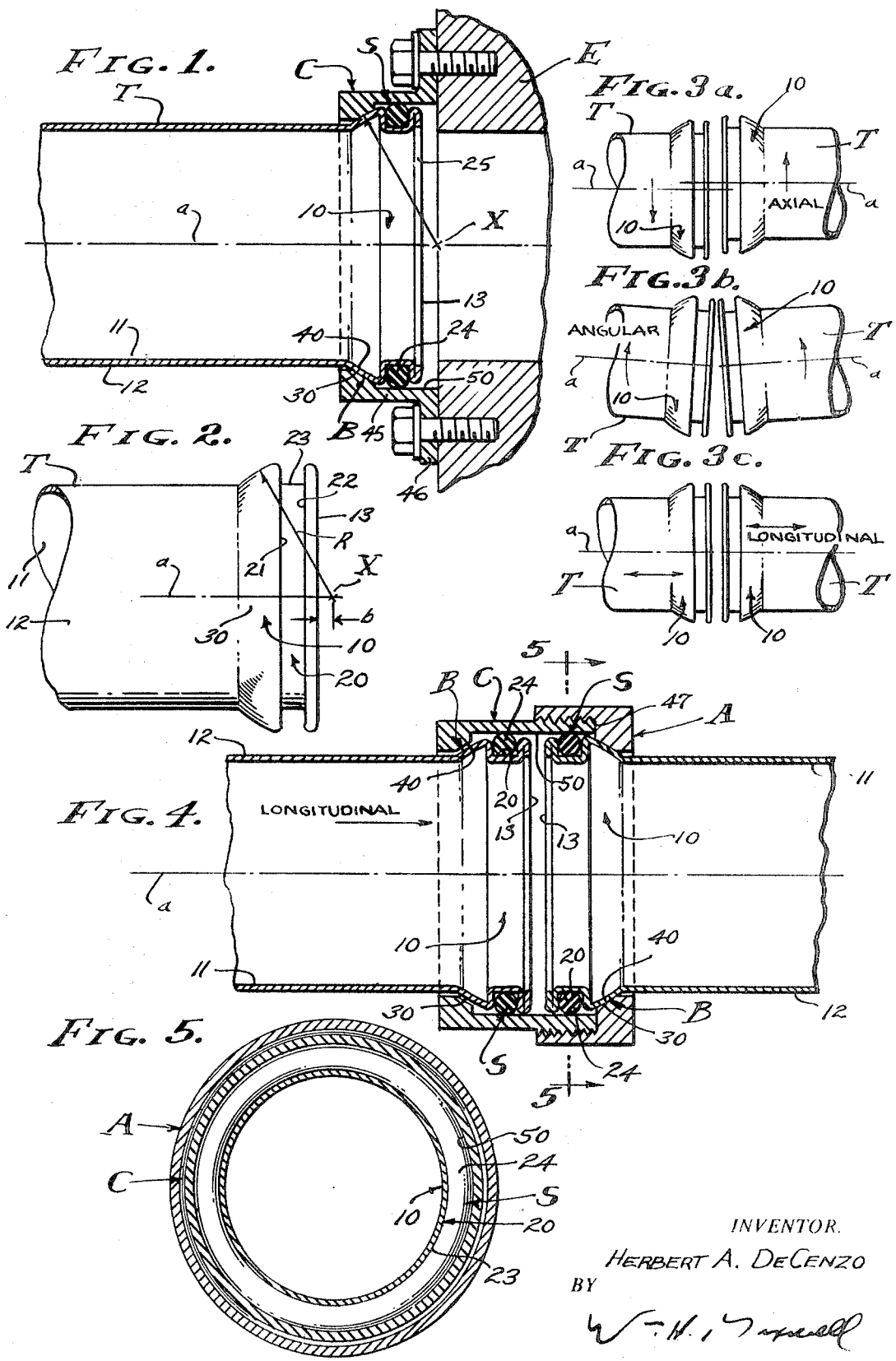
PATENTED AUG 3 1971
3,596,934
SHEET 1 OF 3
INVENTOR.
HERBERT A. DeCENZO

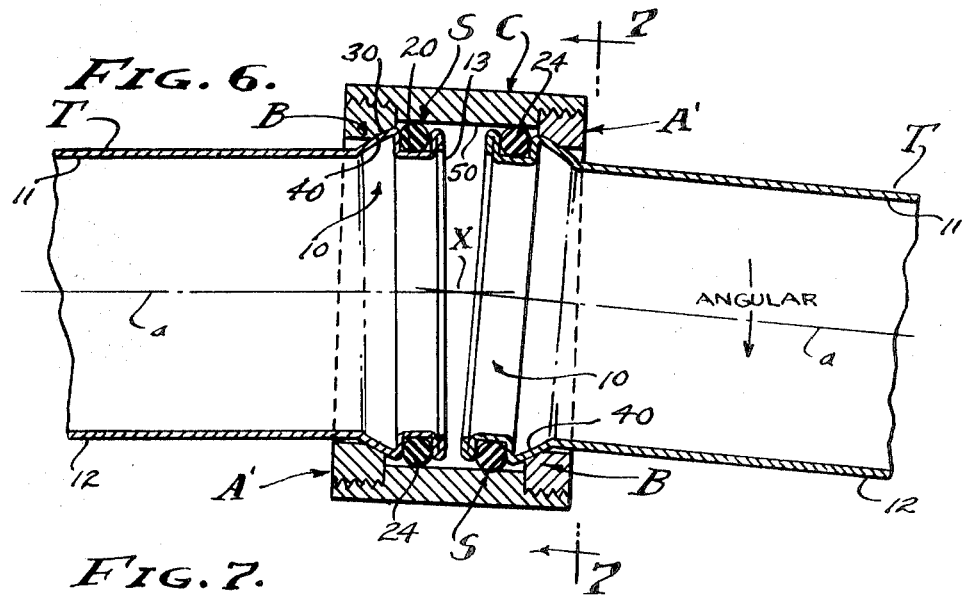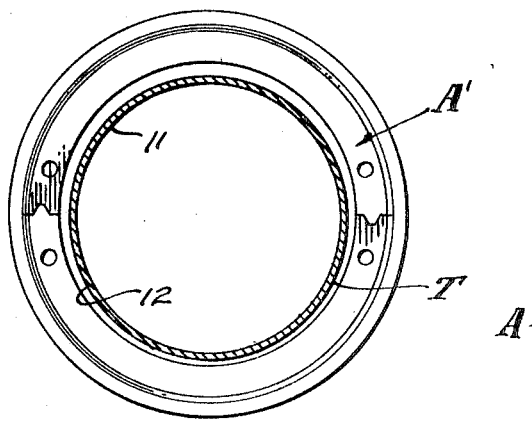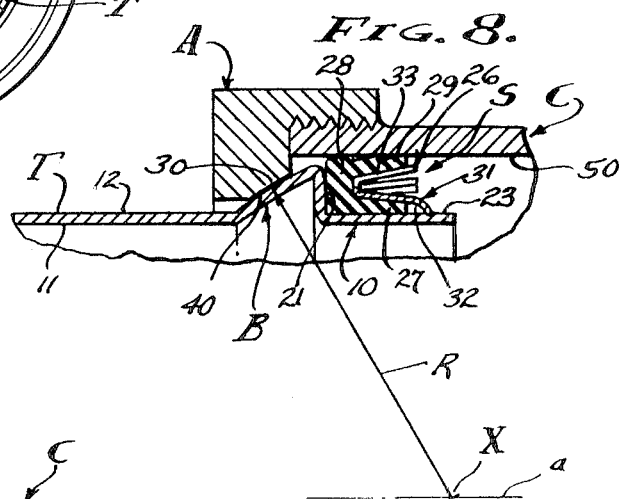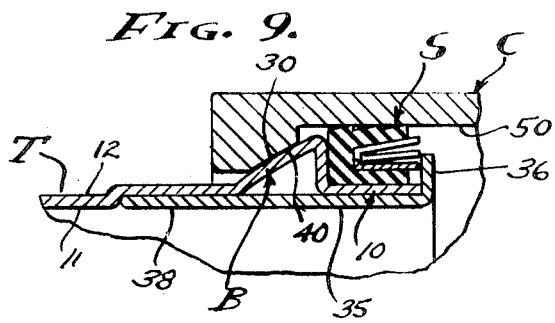

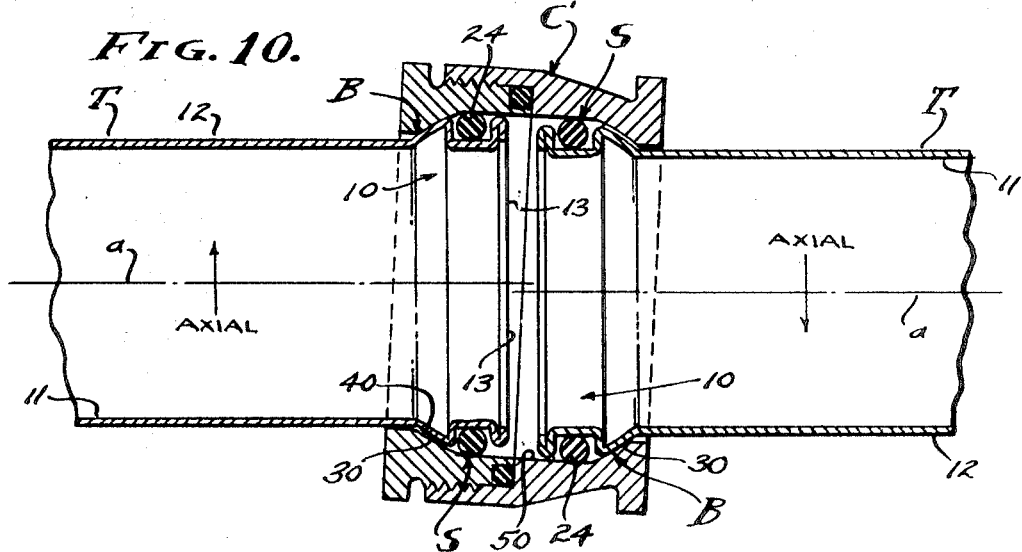
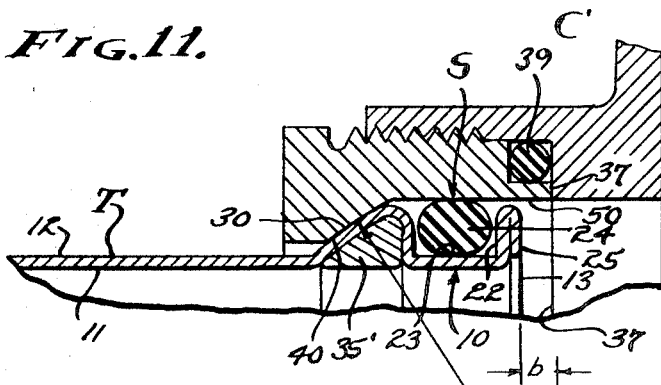
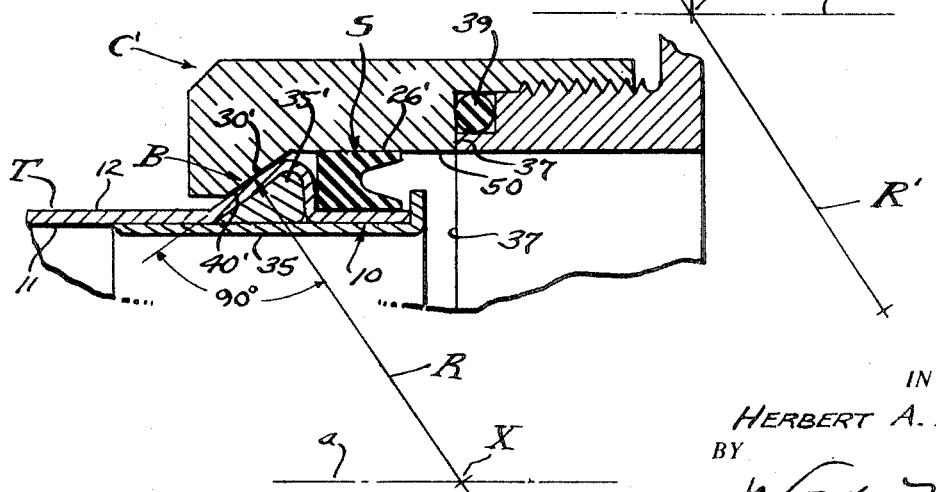

FLEXIBLE FLUIDTIGHT COUPLING FOR TUBES

In the conduction of fluids through piping, and especially in aircraft where weight saving is of prime importance, thin-walled metallic (usually aluminum) tubing is employed and interconnected by means of surrounding sleeve members with elastomeric seals therebetween. Heretofore, the geometrical relation of the various elements involved have been imperfect when misalignments are imposed, permitting sharp localized points of bearing contact of one member against another. Although the flexibility, art teaches tube ends with beaded or integrally channeled configurations, the designs thereof are subject to the above-mentioned imperfect localized points of bearing when axial and angular misalignments are imposed. Further, the prior art teaches coupling concepts wherein a ferrule is swaged onto the tube end, but which is subject to over and/or under swagging, and consequently subject to breakage; and all of which are failures which cannot be adequately anticipated by visual inspections, and impractically by destruction. As a consequence, there is a great need for couplings of the type under consideration that are lightweight, retain flexibility, provide uniformly large predetermined areas of bearing engagement, remain fluidtight within expected design parameters, and which are subject to visual inspection that will ensure their expected duration of service.

An object of this invention is to provide an improved flexible coupling wherein tubular fluid conducting members are flexibly joined for limited misalignments axially, angularly and longitudinally, and especially to provide a perfect mechanical geometry therein whereby a predetermined area of bearing engagement is established between the cooperatively interengaged members. With the present invention, a flexible fluidtight coupling is established for thin-wall piping by means of bearing means in the form of a semispherical or equivalent shoulder captured within a complementary retainer, there being a cylindrical sealing face integral with the retainer to engageably surround a yieldingly depressible sealing member in the form of a ring carried next adjacent to the said shoulder and over the end of the pipe being coupled.

Another object of this invention is to provide an improved coupling of the type hereinabove referred to and which is particularly susceptible to the integral formation of the cooperating members thereof on the end portion of the tubes to be interconnected. With the present invention, the prior art weaknesses and leakages as caused by improper and noninspectable joinder, such as swaged joints, are eliminated.

It is still another object of this invention to provide an improved coupling of the type hereinabove referred to and which minimizes the possible lines of leakage and which virtually eliminates the possibility of extruding the sealing members, such as caused by overtorquing of gland members in certain prior art structures. With the present invention, there is a seal groove of predetermined cross-sectional area surrounded by a sleeve member having limited axial as well as angular displacement relative to said groove, whereby eccentricity of the groove and said sleeve member is restricted within operable limits, maintaining a preload upon the seal and precluding extrusion of the seal when operating within the fluid pressures designed for.

The various objects and features of this invention will be fully understood from the following detailed description of the typical preferred forms and applications thereof, throughout which description reference is made to the accompanying drawings, in which:

FIG. 1 is a longitudinal sectional view illustrating the fundamental concept of the flexible fluidtight coupling for a tube.

FIG. 2 is a view showing the end of a tube, as it would appear removed from the illustration of FIG. 1.

FIGS. 3a, 3b and 3c are separate views showing the misalignments that are accommodated by the coupling, namely axial, angular and longitudinal misalignments respectively.

FIG. 4 is a view similar to FIG. 1 showing a second embodiment of the flexible fluidtight coupling for tubes, and illustrates longitudinal misalignment.

FIG. 5 is a sectional view taken as indicated by line 5-5 on FIG. 4.

FIG. 6 is a view similar to FIGS. 1 and 4 and shows a third embodiment of the flexible fluidtight coupling for tubes, and illustrates angular misalignment.

FIG. 7 is a sectional view taken as indicated by lines 7-7 on FIG. 6.

FIGS. 8 and 9 are enlarged detailed fragmentary views showing two distinct seals that are advantageously incorporated in the flexible fluidtight coupling.

FIG. 10 is a view similar to FIGS. 1, 4 and 6 and shows a fourth embodiment of the flexible fluidtight coupling for tubes, and illustrates axial misalignment.

FIGS. 11 and 12 are enlarged detailed fragmentary views showing distinct separability of the retainers that secure the coupling together.

This invention is particularly useful in the coupling of thin-walled liquid transporting tubes as they are used in aircraft and the like, wherein the tubes are metallic or nonmetallic members and preferably aluminum. Consequently, the employment of thin-walled soft metal tubular members requires special treatments in order to maintain maximum strength and durability when operating according to requirements under working conditions. Thus, the coupling of two or more liquid transporting tubular members must not only remain fluidtight under working conditions, but those conditions require subjection of the coupling joinder to misalignments which involve axial, angular and longitudinal as well as rotational displacements. For example, the joinder of 2-inch (nominal) diameter tubular members can require axial displacements in all radial directions of three thirty-seconds inch; can require angular displacements in all radial directions of 7°; can require longitudinal displacements in end to end directions of three-eighths inch; while requiring positioning in any selected rotative relation of one member to the other; and all of which requirements function alone or together as circumstances require and dynamically as conditions are imposed due to structure movements that subject the two members and intermediate coupling member to all variations of said requirements.

In order to meet the above requirements and for providing a flexible fluidtight coupling for tubes and like members, the present invention provides means on the terminal end portion 10 of each tube T to be connected and namely a bearing means B and a sealing means S, and provides a coupling member C and a retainer A when required, all of which are cooperatively engageable upon assembly to accommodate all of those conditions set forth above, namely axial, angular, longitudinal and rotative displacements whether static or moving.

The tube T to be connected is a cylindrical member having an inner diameter wall 11 and an outer diameter wall 12, the tubular body thereof being of thin-walled cross section, as shown. Although this invention can be practiced by fastening an end fitting onto the tube T, it is most advantageous and feasible with the present invention to form the bearing means B and sealing means S integrally with and in the end portion 10 of said tube T. Accordingly, the inner and outer diameter walls 11 and 12 are reshaped at or in the end portion 10 to establish the means B and S, and to the end that the tubular member remains imperforate and leakproof. Although the tubular member or tube T can be made of various materials and by various methods, in practice a malleable material is utilized and which can be shaped and beaded, as shown, as by pressing, swagging, rolling, bending and/or spinning.

In accordance with the invention, the sealing means S occupies the terminal end portion of the tube T while the bearing means S is next adjacent thereto and spaced from the terminal end 13. THe sealing means S formation in the tube T is characteristically an annular seat 20 surrounding the end portion of the tube, the end 13 being disposed in a plane normal to the central axis a of the tube, while the bearing means B formation in the tube T is characteristically a semispherical shoulder 30, or the like, adjoining the seat 20 and faced inwardly and away from the end 13. The configuration of the seat 20 can vary as may be required for the use of different seals per se. However, a most practical and widely accepted seal is the O-ring, in which case the seat 20 is in the configuration of a radially opening channel or groove.

The bearing means B and its semispherical shoulder 30 is formed on a radius R of substantially larger dimension than the radius to the outer diameter wall 12 of the tube T. In carrying out the invention it is advantageous to expand the diameter of tube T when forming the means B and S, so that there is no restriction within the tube, and the amount of expansion is determined by the radial extent of the seal per se, for example the cross section of the O-ring. Thus, this radial expansion limit has bearing upon the dimension of radius R which is centered at point X on the axis a, preferably beyond the end 13 of the tube T by the dimension b as shown particularly in FIGS. 1 and 2. Note that the dimension b determines the maximum possible longitudinal displacement from bearing means B (for example three-sixteenths inch), and determines the minimum practical dimension for radius R (where it meets and merges with the innermost face of seat 20). In its theoretically perfect form the shoulder 30 is formed concentric with point X and coincidental with axis a establishing an inwardly faced bearing having a true spherical surface (see FIGS. 1—10). However it is feasible to increase the dimension of radius R' by extending it through the point X as illustrated in FIG. 11. And further, it is also feasible to employ a flat shoulder 30' that is chamfered normal to the radius line R that extends to or through point X (see FIG. 12). The form of shoulder shown in FIGS. 11 and 12 is practical due to the short arcuate or chord distance of said shoulder and which renders the radius R dimension infinite in proportion thereto, as it appears in FIG. 11.

The sealing means S and its annular seat 20 is formed concentrically with the axis a, and it is comprised of an innermost face 21 and an opposing outermost face 22 joined by a bottom 23 (see FIG. 2). Thus, the seat 20 is a typical channel-shaped seat or groove especially proportioned and shaped to have sealing engagement with an elastomeric O-ring seal 24. In practice, the body of the tubular member T 1—7, forming the shoulder 30, face 21, bottom 23 and face 22 is one continuous wall, as shown, employing suitable bend radii as circumstances require.

When employing an O-ring seal 24, as shown in FIGS. 1—7, 10 and 11, the bottom 23 is of the same diameter as the tube T, and the outermost face 22 is reinforced by an inwardly turned peripheral lip 25. When employing a lip-type seal 26 as shown in FIG. 8, the outermost face 22 can be omitted and a continuous inner sealing lip 27 slidingly engaged over the bottom 23 and with a back 28 of the seal extending radially in flat engagement against the innermost face 21 to carry a continuous outer lip 29 spaced from and surrounding the lip 27. A self-locking retainer 31 fits engageably against the three parts of the seal 26, having a solid ring 32 that pressures the inner-lip 27 onto the bottom 23 and with a sharp in-turned edge pressed into the bottom 23 to dig at its surface for retention thereon. The seal retainer 31 has an outer ring 33 that is made up of a circumferential series of axially extending fingers that yieldingly urge the outer lip 29 into pressured engagement with the smooth uninterrupted cylindrical inner wall of the coupling member C.

A further modification is shown in FIG. 9 wherein flow continuity is maintained within the tube T by means of a sleeve member 35 that underlies the formation of the bearing means B, said sleeve member 35 having a radial stop flange 36 that retains the seal, whether an O-ring type or lip-type seal as shown. In practice, the sleeve member 35 is placed into a shouldered bore 37, so that its inner diameter wall 38 forms a cylindrical continuation of inner diameter wall 11.

In accordance with the invention a cylindrical coupling member C encircles the end portion 10 of the tube T, including the bearing means B and sealing means S to cooperatively engage therewith. There are several ways in which the coupling member C is formed with a bearing face 40 to extensively engage with the shoulder 30, and an uninterrupted sealing face 50 to engage with the seal 24 or 26. In each instance there is a sealing face 50 in the form of a cylindrical bore entering the open end of the coupling member and the bearing face 40 can be made integral with the innermost end of the member C or it can be in the form of a retainer A attached thereto, both forms thereof being shown in the drawings. The coupling member C is in the nature of a fitting and in its simplest form shown in FIG. 1 is adapted to secure a single tube T to the side of an equipment E; and in this case the coupling member C comprises a tubular body 45 with a flange 46 in a plane coincidental with the center point X, and the bearing face 40 is integral with the body 45 of said member.

The bearing face 40 is semispherical and complimentary to the shoulder 30 with which it engages when the coupling if fully extended longitudinally. The bearing face 40 is disposed radially inward of the sealing face 50 and surrounds the outer diameter wall 12 with a clearance of three thirty-seconds inch in order to permit the displacement hereinabove specified. The bearing face 40 is also formed on the radius R and centered at X on the axis a beyond the end 13 of the tube T by the dimension b. The face 40 is formed concentric with point X and concentric with axis a establishing an outwardly faced bearing having a true spherical surface opposed to the above-described shoulder 30. Consequently, when the face 40 is engaged with shoulder 30 there is full coextensive engagement.

When assembly requirements dictate axial removal of the tube T from the coupling member C, a detachable retainer A is employed with the bearing face 40 thereon and removable from the tubular body 45. The retainer can be fastened to the body 45 in various ways to engage and be positioned by a stop 47, whereby the affect of dimension b is predetermined. For example, the retainer can be cemented in place, or clamped in place by additional means such as by a series of screws or tie rods, or as by a suitable bayonet coupling (none of which is shown). The retainer A can be threaded externally onto said body as shown in FIGS. 4 and 8, and in FIGS. 6 and 7 the retainer A' is shown threaded internally into said body. The advantage of retainer A' is that it can be made in two half-shell segments that are keyed together and embraceably assembled over the tubular member T and then revolved as a unit into working position, and to the end that the retainer can be handled independently of the tube before assembly.

The sealing face 50 is an uninterrupted cylindrical bore in the body 45 and in accordance with the invention this face surrounds the concentric outer diameter of means B and S (on the end portion 10 of tube T) with substantial clearance. In practice, the clearance can be three thirty-seconds inch in order to permit a total lateral or the axial (axis a of the tube T to axis a of the coupling member C) displacement of three thirty-seconds inch hereinabove referred to. Further, the said clearance of three thirty-seconds inch permits the 7° angular displacement hereinabove referred to. Accordingly, the elastomeric seals 24 and 26 and/or plastic seals are capable of substantial radial compression, and/or depression when yieldingly installed, thereby permitting the generous amounts of displacement and movements referred to, and all of which is feasible in a nominal 2-inch diameter coupling, the example of which is given herein.

A most utilitarian application of the present invention is the coupling together of two apposed tubular members T with a coupling member C telescopically surrounding the end portions 10 of the two tubes, and with a pair of seals 24 (or 26) sealing with the member C and each tube T respectively (see FIG. 4). In this installation, one or both of the retainers A are removable, for example the one retainer A is removable in which case the coupling member C and integral bearing face 40 slides over one tube T from the end remote from end 13, or is permanently assembled therewith. It will be seen that this double installation multiplies the coupling flexibility by a factor of two, each tube T and coupling member C arrangement enhancing the functions of the other respectively. Further and as shown in FIG. 6, the center points X of the two apposed tubular members T may be coincidental when the shoulders 30 and faces 40 of the three members are coextensively engaged, thereby establishing uniform force distribution when the two tubes are tensioned against each other with the coupling member between.

Referring now to FIGS. 10, 11 and 12 the coupling C' is sectional with a plane of joinder next adjacent to and/or intermediate the sealing means S, and wherein the sealing face 50 remains uninterrupted insofar as engagement with seals 24 or 26' is concerned. In practice, the plane of joinder of the coupling sections is coincidental with the point X, thereby displacing abutting ends 37 from the ends 13 of the tubes T and out of range of the seals. Various means of joinder can be employed in connecting the sections of the coupling, for example a threaded connection 38 as shown, and in which case an O-ring seal 39 is provided at and surrounding the abutting ends 37. FIG. 10 illustrates a male and female threaded connection, while FIGS. 11 and 12 specifically illustrate male and female connection respectively. In FIGS. 11 and 12 the feasibility of reinforcement is shown and wherein either or both a ring 35' and/or sleeve 35 are used singly and/or together, the ring 35' occupying the inner diameter space established by enlarging the tube T to form the shoulder 30 (30').

From the foregoing it will be seen that the coupling member C can be provided with one or more cylindrical bores to establish the uninterrupted sealing face 50 to engage with circumferential sealing portions of the resilient elastomeric or plastic seal 24 or 26. The coupling member C can be a single coupling with one retainer A having its spherical or substantially spherical (see FIG. 11) or equivalent conical (see FIG. 12) bearing face 40' to oppose the complimentary shoulder 30' of bearing means B on tube T, thereby positively retaining the tube T for any combination of axial, angular, longitudinal and rotative displacements. The coupling C can also be a double coupling with a through bore and with opposed bearing faces 40 formed integrally or by end retainers A and A' establishing two spherical bearing faces to oppose the two spherical faces of bearing means B on apposed tubes T, thereby retaining the tubes T for said combination of displacements. The coupling C can take other fitting forms such as "T," "Y," "L," and "X" or reducing fittings and the like; any and all branches of which can include the coupling features herein disclosed. From FIG. 4 is will be observed that longitudinal misalignment displaces the contact of shoulder 30 from bearing face 40, and likewise in FIG. 10 that the axial misalignment rocks contact of shoulder 30 on bearing face 40, however without adversely affecting the engagement of seal 24 or 26, and in either case maintaining pressured engagement with the uninterrupted sealing face 50. A feature of the coupled engagement is the large diameter of the contacting shoulder and face 30 and 40 which, due to deflections, press together over extended arcuate areas even though there is axial misalignment as shown in FIG. 10. In each coupling assembly the end retainment of a tube T to the coupling member C is characterized by the male to female spherical or substantially spherical engagement of the face 40 with shoulder 30 whereby full or at least extensive face to face and sliding contact is maintained at any time said members are brought together.

Having described only a typical preferred forms and applications of my invention, I do not wish to be limited or restricted to the specific details herein set forth, but wish to reserve to myself any modification or variations that may appear to those skilled in the art:

Having described my invention I claim:

1. A flexible fluidtight coupling comprising, a tubular member having a central axis, a coupling member and a seal therebetween: said tubular member including, inner and outer diameter walls terminating in an end disposed normal to its central axis, a sealing means at the terminal end portion of the tubular member and comprising an annular seat surrounding the end of the tubular member, and a bearing means spaced from the end of the tubular member and next adjacent to said sealing means and comprising an annular shoulder faced away from said end and having a radius disposed normal thereto and extended angularly through said central axis beyond said end and greater than the normal radius to said outer diameter wall; said coupling member including, a body with a cylindrical bore surrounding the sealing means and bearing means with clearance, and a retainer disposed radially inward of the cylindrical bore and surrounding the outer diameter wall with clearance and comprising a bearing face complementary to and opposed to and engageable with said annular shoulder; and said seal therebetween being engageable and yieldingly depressible between the annular seat of said tubular member and the cylindrical bore in said coupling member; whereby said coupling member is captured against separation outwardly from the end of said tubular member and is movable rotatably and into limited axial, angular and longitudinal misalignments with respect to the axis of the tubular member.

2. The flexible fluidtight coupling as set forth in claim 1 and wherein the end portion of the tubular member is formed radially into the configuration of the said sealing means and adjoining coupling means, said tubular member being imperforate to said end thereof.

3. The flexible fluidtight coupling as set forth in claim 1 and wherein the sealing means includes spaced inner and outer faces in planes normal to the central axis of said tubular member and extending radially from the said annular seat embraced therebetween and forming a groove, the seal between the two members being an O-ring of elastomeric material carried in said groove and engaging the cylindrical bore and the inner and outer faces and annular seat embraced therebetween.

4. The flexible fluidtight coupling as set forth in claim 1 and wherein the sealing means includes spaced inner and outer faces in planes normal to the central axis of said tubular member and extending radially from the said annular seat embraced therebetween and forming a groove, the seal between the two members being an O-ring of elastomeric material carried in said groove and engaging the cylindrical bore and the inner and outer faces and annular seat embraced therebetween, said outer face being reinforced by an extended peripheral lip rounded to pass the inside diameter of the O-ring.

5. The flexible fluidtight coupling as set forth in claim 1 and wherein the end portion of the tubular member is formed radially outward from its nominal diameter and into said annular shoulder, said annular seat remaining coincidental with the nominal diameter of said tubular member.

6. The flexible fluidtight coupling as set forth in claim 1, wherein the end portion of the tubular member is formed radially outward from its nominal diameter and into said annular shoulder, said annular seat remaining coincidental with the nominal diameter of said tubular member, and wherein the sealing means includes spaced inner and outer faces in planes normal to the central axis of said tubular member and extending radially from the said annular seat embraced therebetween and forming a groove, the said inner face being joined at its periphery to the next adjacent annular shoulder, the seal between the two members being an O-ring of elastomeric material carried in said groove and engaging the cylindrical bore and the inner and outer faces and annular seat embraced therebetween.

7. The flexible fluidtight coupling as set forth in claim 1, wherein the said annular shoulder is arcuately curved about said angularly disposed radius extended through said central axis.

8. A flexible fluidtight coupling comprising, a tubular member having a central axis, a coupling member and a seal therebetween: said tubular member including, imperforate inner and outer diameter walls terminating in an end disposed normal to its central axis, a sealing means formed radially outward at the terminal end portion of the tubular member and comprising an annular seat surrounding the end of the tubular member, and a bearing means spaced from the end of and formed radially outward of the tubular member and next adjacent to said sealing means and comprising an annular and arcuately curved shoulder faced away from said end and having a radius disposed normal thereto and extended through said central axis beyond said end and greater than the normal radius to said outer diameter wall; said coupling member including, a body with a cylindrical bore surrounding the sealing means and bearing means with clearance and comprising a bearing face complementary to and opposed to and engageable with said annular shoulder; and said seal therebetween being engageable and yieldingly depressible between the annular seat of said tubular member and the cylindrical bore in said coupling member; whereby said coupling member is captured against separation outwardly from the end of said tubular member and is movable rotatably and into limited axial, angular and longitudinal misalignments with respect to the axis of the tubular member.

9. The flexible fluidtight coupling as set forth in claim 8, wherein said annular seat remains coincidental with the nominal diameter of said tubular member, and wherein a sleeve is placed within the tubular member coextensively within the said annular and arcuately curved shoulder forming a continuation of the inner diameter wall of the said tubular member.

10. A flexible fluidtight coupling comprising, a tubular member having a central axis, a removable coupling member and a seal therebetween: said tubular member including, inner and outer diameter walls terminating in an end disposed normal to its central axis, a sealing means at the terminal end portion of the tubular member and comprising an annular seat surrounding the end of the tubular member, and a bearing means spaced from the end of the tubular member and next adjacent to said sealing means and comprising an annular shoulder faced away from said end and having a radius disposed normal thereto and extended angularly through said central axis beyond said end and greater than the radius to said outer diameter wall; said removable coupling member including, a body engageable over the first mentioned tubular member and with a cylindrical bore surrounding the sealing means and bearing means with clearance, and a detachable retainer disposed radially inward of the cylindrical bore and surrounding the outer diameter wall with clearance and comprising a ring with attachment means releasably securing it to the body and comprising a bearing face faced complementary to and opposed to and engageable with said annular shoulder; and said seal therebetween being engageable and yieldingly depressible between the annular seat of said tubular member and the cylindrical bore in said coupling member; whereby said coupling member is captured against separation outwardly from the end of said tubular member and is movable rotatably and into limited axial, angular and longitudinal misalignments with respect to the axis of the tubular member.

11. The flexible fluidtight coupling with removable coupling members as set forth in claim 10 and wherein the said attachment means of the ring is threadedly engaged onto the body thereof 12. The flexible fluidtight coupling with removable coupling members as set forth in claim 10, wherein there is a stop shoulder on the body of the removable coupling member and wherein the said ring of the coupling member is threadedly engaged onto the body thereof and positioned against said stop shoulder.

13. The flexible fluidtight coupling with removable coupling members as set forth in claim 10, wherein the said ring of the coupling member is of separable half-shell configuration embraceably engaged over the said tubular member and with said attachment means threadedly engaged into the body thereof.

14. The flexible fluidtight coupling with removable coupling members as set forth in claim 10, wherein there is a stop shoulder on the body of the removable coupling member and wherein the said ring of the coupling member is of separable half-shell configuration embraceably engaged over the said tubular member and with said attachment means threadedly engaged into the body thereof and positioned against said stop shoulder.

15. A flexible fluidtight coupling comprising, two apposed tubular members and each having an independent central axis, a coupling member and a seal between each tubular member and said coupling member: each of said tubular members including, inner and outer diameter walls terminating in an end disposed normal to its central axis, a sealing means at the terminal end portion of the tubular member and comprising an annular seat surrounding the end of the tubular member, and a bearing means spaced from the end of the tubular member and next adjacent to said sealing means and comprising an annular shoulder faced away from said end and having a radius disposed normal thereto and extended angularly through said central axis beyond said end and greater than the radius to said outer diameter wall; said coupling member including, a body with a cylindrical bore telescopically surrounding the sealing means and bearing means of the two apposed tubular members with clearance, and a retainer at each opposite end of the coupling member and disposed radially inward of the cylindrical bore and each surrounding the outer diameter wall of the two tubular members respectively with clearance and each comprising a bearing face complementary to and opposed to and engageable with a complementary annular shoulder; and each of said seals therebetween being engageable and yieldingly depressible between one of the annular seats of said tubular members respectively and the cylindrical bore in said coupling member; whereby said tubular members are captured against separation from their end to end apposed relation and are relatively movable rotatably and movable into limited axial, angular and longitudinal misalignments one with respect to the other.

16. The flexible fluidtight coupling of two apposed tubular members as set forth in claim 15 and wherein at least one retainer is a ring that is separable from the said coupling member.

17. The flexible fluidtight coupling of two apposed tubular members as set forth in claim 15, wherein the end portions of the tubular members are formed radially into the configurations of the said sealing means and adjoining coupling means, said tubular members being imperforate to said ends thereof, and wherein the said annular shoulders are described from centers spaced outwardly from the ends of their respective tubular members.

18. The flexible fluidtight coupling of two apposed tubular members as set forth in claim 15, wherein the end portions of the tubular members are formed radially outward from their nominal diameters and semispherically into said annular shoulders, said annular seats remaining coincidental with the nominal diameters of said tubular members respectively, and wherein the said semispherical formed annular shoulders are described from centers spaced outwardly from the ends of their respective tubular members.